United States Patent
Kim et al.

(10) Patent No.: US 12,124,216 B2
(45) Date of Patent: Oct. 22, 2024

(54) BEAM EXPANDING FILM AND HOLOGRAPHIC DISPLAY APPARATUS INCLUDING THE SAME

(71) Applicants: SAMSUNG ELECTRONICS CO., LTD., Suwon-si (KR); Korea University Research and Business Foundation, Sejong Campus, Sejong-si (KR)

(72) Inventors: Yunhee Kim, Seoul (KR); Hwi Kim, Seoul (KR); Youngjae Kim, Seongnam-si (KR); Hoon Song, Yongin-si (KR); Hongseok Lee, Seoul (KR)

(73) Assignees: SAMSUNG ELECTRONICS CO., LTD., Suwon-si (KR); Korea University Research and Business Foundation, Sejong Campus, Sejong-si (KR)

( * ) Notice: Subject to any disclaimer, the term of this patent is extended or adjusted under 35 U.S.C. 154(b) by 603 days.

(21) Appl. No.: 17/371,415

(22) Filed: Jul. 9, 2021

(65) Prior Publication Data
US 2022/0253017 A1     Aug. 11, 2022

(30) Foreign Application Priority Data
Feb. 8, 2021   (KR) .................. 10-2021-0017867

(51) Int. Cl.
*G03H 1/22* (2006.01)
*G02B 1/00* (2006.01)
*G02B 27/09* (2006.01)

(52) U.S. Cl.
CPC ........... *G03H 1/2286* (2013.01); *G02B 1/005* (2013.01); *G02B 27/09* (2013.01);
(Continued)

(58) Field of Classification Search
CPC .................. G02B 27/09; G02B 27/0922; G02B 27/0938; G02B 27/0944; G02B 1/00;
(Continued)

(56) References Cited

U.S. PATENT DOCUMENTS 10,529,290 B1 * 1/2020 Parsons ............ G02F 1/133514
2011/0149018 A1   6/2011 Kroll et al.
(Continued)

FOREIGN PATENT DOCUMENTS

JP       2010-507826 A    3/2010
KR  10-2021-0074157 A    6/2021

OTHER PUBLICATIONS

Xueqin Huang et al., "Dirac cones induced by accidental degeneracy in photonic crystals and zero-refractive-index materials", Nature Materials, vol. 10, 2011, 5 pages total.

*Primary Examiner* — Sultan Chowdhury
(74) *Attorney, Agent, or Firm* — Sughrue Mion, PLLC

(57) ABSTRACT

A beam expanding film includes a first material layer and a photonic crystal layer that expands a width of incident light and emits light having an expanded width. The photonic crystal layer includes a first material layer and a plurality of second material layers buried in the first material layer. A holographic display apparatus includes a backlight unit configured to provide coherent collimated light; a beam expanding film described above and facing the backlight unit; a flat panel arranged between the backlight unit and the beam expanding film to provide a hologram; and a lens configured to focus a holographic image on a space.

20 Claims, 11 Drawing Sheets

(52) U.S. Cl.
CPC ....... *G02B 27/0944* (2013.01); *G03H 1/2205* (2013.01); *G03H 2001/221* (2013.01)

(58) Field of Classification Search
CPC .......... G02B 1/002; G02B 1/005; G02B 1/02; G02B 30/56; G03H 1/2205; G03H 1/2271; G03H 1/2281; G03H 1/2286; G03H 1/2294; G03H 2223/23; G03H 2001/221; G03H 2001/2239
See application file for complete search history.

(56) References Cited

U.S. PATENT DOCUMENTS

| | | | |
|---|---|---|---|
| 2011/0170042 A1* | 7/2011 | Cho | G02F 1/133553 349/106 |
| 2015/0160530 A1* | 6/2015 | Han | G02B 30/00 359/9 |
| 2016/0061994 A1* | 3/2016 | Noda | H01L 31/054 359/558 |
| 2019/0219872 A1* | 7/2019 | Shi | G02B 1/005 |
| 2019/0324272 A1 | 10/2019 | Seo et al. | |
| 2020/0142355 A1 | 5/2020 | An et al. | |
| 2020/0272102 A1* | 8/2020 | Lin | G02B 27/0994 |
| 2020/0393794 A1 | 12/2020 | Kroll et al. | |
| 2021/0181678 A1 | 6/2021 | Kim et al. | |

\* cited by examiner

Input image

Far-field simulation

Input image

Far-field simulation

BEAM EXPANDING FILM AND HOLOGRAPHIC DISPLAY APPARATUS INCLUDING THE SAME

CROSS-REFERENCE TO RELATED APPLICATION

This application is based on and claims priority under 35 U.S.C. § 119 to Korean Patent Application No. 10-2021-0017867, filed on Feb. 8, 2021, in the Korean Intellectual Property Office, the disclosure of which is incorporated by reference herein in its entirety.

BACKGROUND

1. Field

The disclosure relates to display apparatuses, and more particularly, to beam expanding films and holographic display apparatuses including the beam expanding films to provide a wider viewing window.

2. Description of Related Art

As a method of implementing a three-dimensional (3D) image, a glasses method and a glass-less method are widely commercialized and used. The glasses method includes a polarization glasses method and a shutter glasses method. The glass-less method includes a lenticular method and a parallax barrier method. These methods use binocular parallax of both eyes, and thus, there is a limit in increasing the number of viewpoints, and also, a depth perceived by the brain does not match a focus of the eyes, thereby making a viewer feel fatigued.

As a 3D image display method in which a depth perceived by the brain matches the focus of the eyes and that may provide full parallax, a holographic display method is being considered. The holographic display method uses a principle of reproducing an image of an original object by irradiating reference light onto a hologram pattern in which an interference pattern obtained by interference between object light reflected from the original object and the reference light is recorded. In the case of a holographic display method currently being considered, a computer generated hologram (CGH) signal is provided to a spatial light modulator as an electrical signal. According to the input CGH signal, the spatial light modulator forms a hologram pattern and diffracts the reference light, and thus, a 3D image may be generated.

SUMMARY

Provided are beam expanding films capable of expanding a viewing window of a holographic display apparatus by expanding an incident beam more widely.

Provided are holographic display apparatuses including such beam expanding films.

Additional aspects will be set forth in part in the description which follows and, in part, will be apparent from the description, or may be learned by practice of embodiments of the disclosure.

In accordance with an aspect of the disclosure, a beam expanding film includes a photonic crystal layer that expands a width of incident light and emits light having an expanded width, the photonic crystal layer including a first material layer; and a plurality of second material layers buried in the first material layer.

The beam expanding film may further include a transparent substrate having a refractive index less than a refractive index of the photonic crystal layer, wherein the photonic crystal layer is provided on the transparent substrate.

The photonic crystal layer may include a double-zero index (DZI) material.

Each of the plurality of second material layers may be separated from and parallel to each other of the plurality of second material layers, and each of the plurality of second material layers may have a rod shape having a round cross-section.

A space between adjacent second material layers of the plurality of second material layers may be filled with the first material layer.

Each of the plurality of second material layers may include amorphous silicon.

Each of the plurality of second material layers may be separated from and parallel to each other of the plurality of second material layers, and each of the plurality of second material layers may include a plane facing a plane of each other of the plurality of second material layers.

Each of the plurality of second material layers may be arranged perpendicular to the incident light.

Each of the plurality of second material layers may include a plurality of stacked first layers and second layers.

The plurality of stacked first layers and second layers may be sequentially and alternately stacked.

A refractive index of the first material layer, a refractive index of the plurality of first layers, and a refractive index of the plurality of second layers may be different from each other.

When a wavelength of the incident light is $\lambda$, a thickness of each of the plurality of stacked first layers and second layers may be about $\lambda/4$.

The refractive index of the first material layer may be less than the refractive index of the plurality of second layers, and the refractive index of the plurality of first layers may be greater than the refractive index of the plurality of second layers.

Each of the plurality of first layers may include a material that is transparent to the incident light and has a refractive index greater than a refractive index of the plurality of second layers.

Each of the plurality of second layers may include a material that is transparent to the incident light and has a refractive index less than a refractive index of the plurality of first layers.

In accordance with an aspect of the disclosure, a holographic display apparatus includes a backlight unit configured to provide coherent collimated light; the beam expanding film of an above-described aspect of the disclosure facing the backlight unit; a flat panel arranged between the backlight unit and the beam expanding film, the flat panel being configured to provide a hologram; and a lens configured to focus a holographic image on a space.

The lens may be arranged between the backlight unit and the flat panel.

The lens may be arranged between the flat panel and the beam expanding film.

The lens may be arranged at a position where light emitted from the beam expanding film is directly incident on the lens.

The flat panel may include a spatial light modulator.

The flat panel may include a liquid crystal device (LCD), a semiconductor modulator, a digital micromirror device (DMD), or a liquid crystal on silicon (LCOS).

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
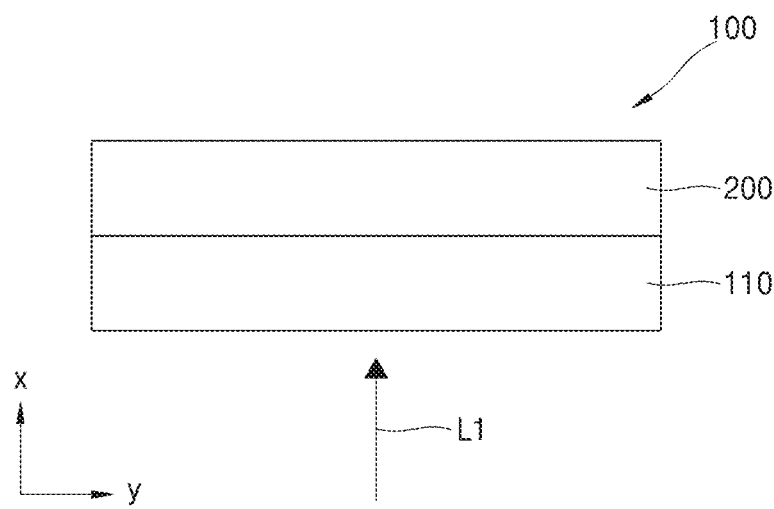
FIG. 1 is a cross-sectional view of a beam expanding film according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Recently, research on implementing a holographic display by using a high-resolution transmissive panel or a spatial light modulator has been conducted. In the case of such a holographic display, a holographic image is provided by modulating light emitted from a coherent light source using a flat panel displaying a computer-generated hologram (CGH) and a lens. In order to provide a focal point of modulated holographic information to the viewer's eyes, a lens having a flat panel size is used. At this time, a viewing area is determined by a pixel pitch of the flat panel that is used, and even though a current high resolution panel (pitch of approximately 50 μm) is used, the viewing area of a hologram image is narrow to about 5 mm.

Therefore, if a narrow viewing angle problem is solved, the holographic display is expected to replace the existing display. In particular, when a holographic display having a thin flat panel structure is possible, a holographic display may be applied to all fields of mobile displays, such as 3D tablets, 3D mobile phones, etc.

The holographic display described below provides a relatively wide viewing window compared to a viewing window of the related art, and thus, may be applied to general holographic displays including the products described above.

Hereinafter, a beam expanding film and a holographic display apparatus including the beam expanding film according to an embodiment will be described in detail with reference to the accompanying drawings. In the drawings, thicknesses of layers or regions may be exaggerated for clarity of the specification. The embodiments of the disclosure are capable of various modifications and may be embodied in many different forms. It will be understood that when an element or layer is referred to as being "on" or "above" another element or layer, the element or layer may be directly on another element or layer or intervening elements or layers. In the following description, like reference numerals refer to like elements throughout the specification.

FIG. 1 shows a beam expanding film 100 according to an embodiment.

Referring to FIG. 1, the beam expanding film 100 includes a substrate 110 and a photonic crystal layer 200. The substrate 110 and the photonic crystal layer 200 are sequentially stacked. The substrate 110 may perform as a supporter for supporting the photonic crystal layer 200 such that the photonic crystal layer is not bent. If the photonic crystal layer 200 is self-supported by itself without being bent, the substrate 110 may be omitted. The substrate 110 may have a thickness that is the same as or different from the thickness of the photonic crystal layer 200. If the thickness of the substrate 110 is different from the thickness of the photonic crystal layer 200, the thickness of the substrate 110 may be greater or less than the thickness of the photonic crystal layer 200. In an example, the thickness of the substrate 110 may be about 0.5 mm to about 1 mm, but is not limited thereto. The substrate 110 may include glass or transparent polymer of a solid material. In an example, the photonic crystal layer 200 may be a 2D dielectric photonic crystal layer or may include a 2D dielectric photonic crystal layer. In one example, the photonic crystal layer 200 may include a transparent material, and may have a refractive index that is greater than that of the substrate 110. The beam expanding film 100 may be a beam expanding unit, a beam expanding layer, or a light expanding member.

Figure 6:
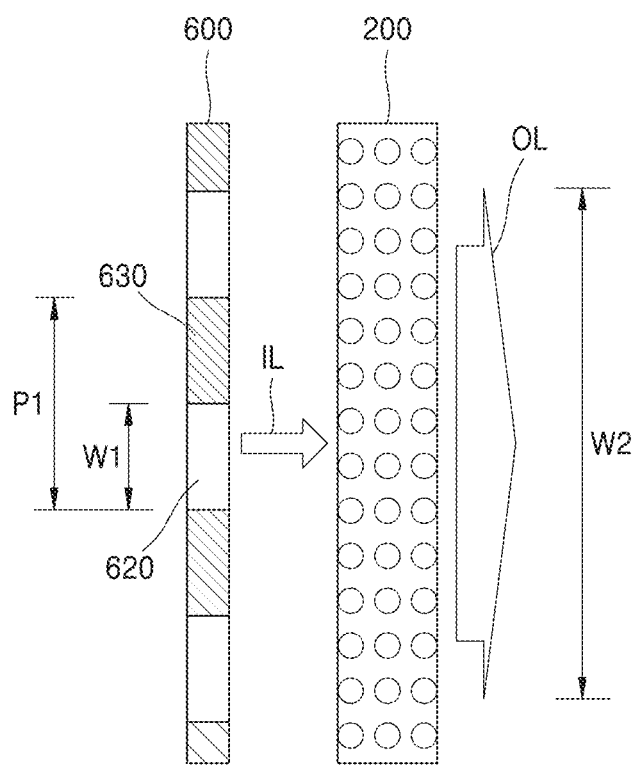
FIGS. 6 and 7 are cross-sectional views showing a case when a beam emitted from a unit pixel of a spatial light modulator and incident on a beam expanding film according to an embodiment is emitted with an expanded width.
Figure 7:
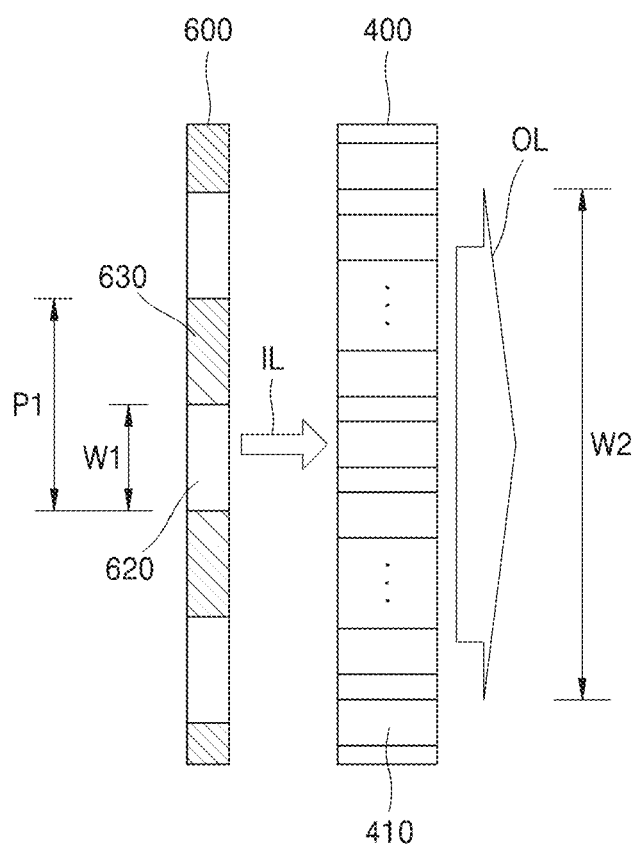

The photonic crystal layer 200 may exhibit properties of double-zero index (DZI) material. The DZI material may have both nearly zero permittivity and nearly zero permeability at a wavelength or frequency. The DZI material generates an optical effect, such as photon tunneling, super-coupling, and control of emission. In addition, the DZI material has a characteristic of aligning a spatial phase of a light wave and a characteristic of expanding a width of a light wave. That is, because the DZI material has an effect of expanding an incident beam, considering that the DZI material is combined with a display panel, the DZI material may exhibit a pixel expansion effect of the display panel. Therefore, when a beam of light incident on the photonic crystal layer 200 is emitted from the photonic crystal layer 200 through the photonic crystal layer 200, a width of the emitted beam is increased compared to a width of the beam or light incident on the photonic crystal layer 200. Therefore, as illustrated in FIGS. 6 and 7, when photonic crystal layers 200 and 400 are combined with a spatial light modulator 600, a width of the light wave IL output from a unit pixel 620 of a panel of the spatial light modulator 600 may be expanded by the photonic crystal layers 200 and 400. As a result, when the photonic crystal layers 200 and 400 are each combined with the spatial light modulator 600, an effect of expanding pixels of the panel of the spatial light modulator 600 may be obtained, and, because a spatial phase of the light wave is aligned, a wide light wave with k=0 may be obtained. As a result, a high-order diffraction portion around zero-order diffraction may be filtered in an area where an image is displayed (e.g., a focal plane of the Fourier lens), and thus, high-order diffraction noise generated when observing a CGH without the photonic crystal layer 200 may be mostly eliminated. As a result, a viewing window for viewing an image (e.g., a holographic image) displayed through a spatial light modulator may be wider than when there is no photonic crystal layer 200. In this respect, the photonic crystal layer 200 may be represented by an anti-diffraction filter (ADF).

In FIG. 1, reference numeral L1 denotes incident light.

Figure 2:
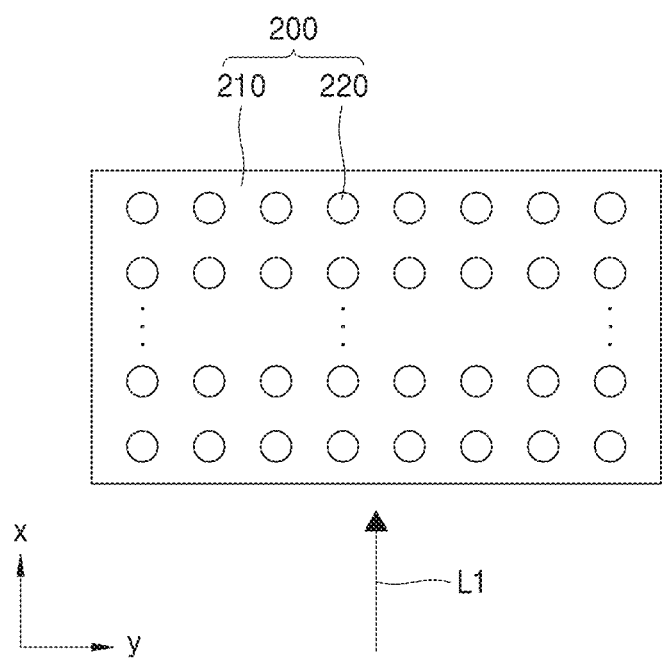
FIG. 2 is a cross-sectional view showing an example of a photonic crystal layer of FIG. 1.
Figure 3:
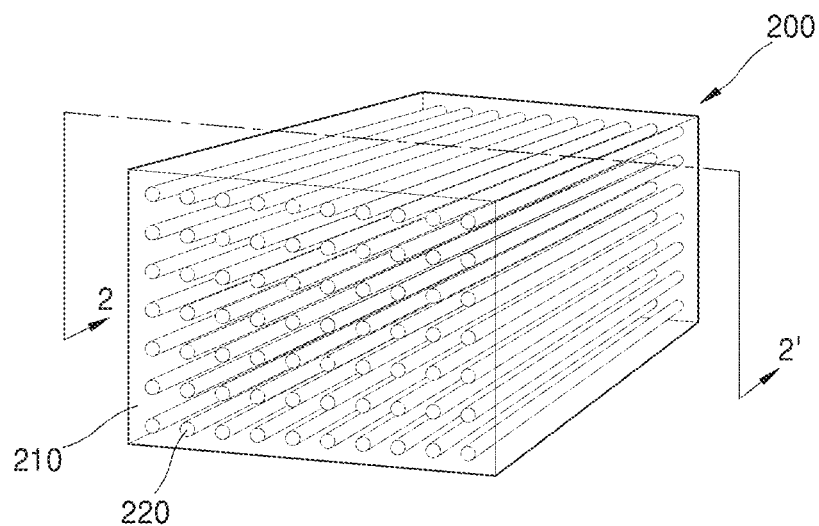
FIG. 3 is a 3D view of the photonic crystal layer illustrated in FIG. 2.

FIG. 2 shows an example of the photonic crystal layer 200 of FIG. 1. FIG. 3 shows a 3D view of the photonic crystal layer 200. FIG. 2 may be the same cross-sectional view as taken along line 2-2' of FIG. 3.

Referring to FIGS. 2 and 3, the photonic crystal layer 200 may include a first material layer 210 and a plurality of second material layers 220 buried in the first material layer 210. Each of the plurality of second material layers 220 is surrounded by the first material layer 210. That is, intervals between adjacent ones of the plurality of second material layers 220 are filled with the first material layer 210. The plurality of second material layers 220 may be in the form of a rod having a given length in the same direction. The plurality of second material layers 220 may be separated from each other and parallel to each other. The plurality of second material layers 220 may extend in a direction perpendicular to incident light L1. The plurality of second material layers 220 may be regularly arranged to form a lattice structure in a plane of an x-axis and a y-axis (hereinafter, referred to as an x-y plane). In this arrangement, intervals between adjacent ones of the plurality of second material layers 220 may be uniform. In one example, the plurality of second material layers 220 may be amorphous silicon (Si) or may include amorphous silicon (Si), but are not limited to this material.

Figure 4:
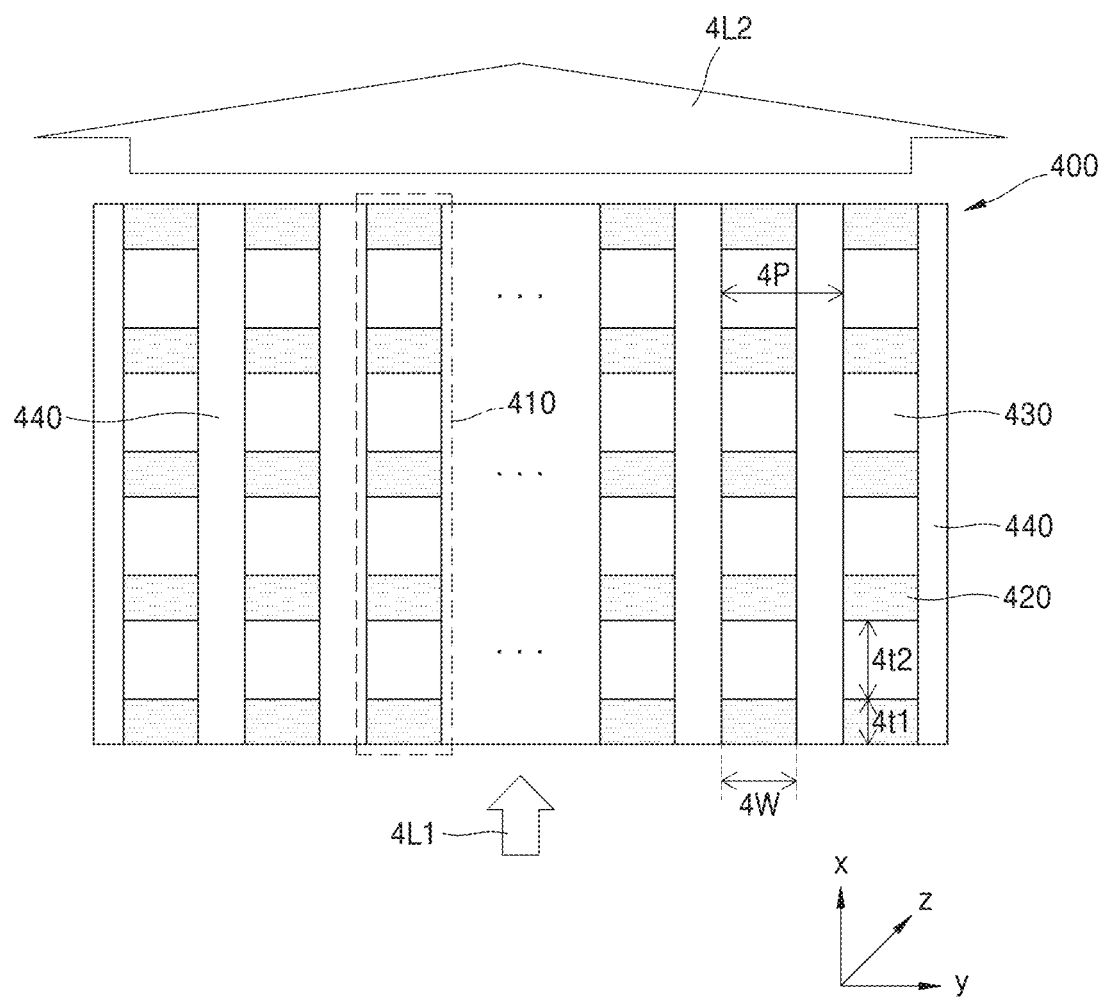
FIG. 4 is a cross-sectional view showing an example of the photonic crystal layer of FIG. 1.

FIG. 4 shows a second photonic crystal layer 400 according to an embodiment.

Referring to FIG. 4, the second photonic crystal layer 400 includes a first material layer 440 and a plurality of second material layers 410 buried in the first material layer 440. The first material layer 440 fills the space between the plurality of second material layers 410. In one example, the first material layer 440 may be air. The plurality of second material layers 410 may be arranged in parallel to each other in a travelling direction of incident light 4L1. The plurality of second material layers 410 may each include surfaces facing each other. The surfaces may include planes parallel to each other. The plurality of second material layers 410 may be arranged to have a first pitch 4P in a lateral direction (y-axis direction in FIG. 4) perpendicular to the incident light 4L1. The first pitch 4P may be constant within a tolerance range across the plurality of second material layers 410. In an example, the first pitch 4P may be about 427 nm. Each of the plurality of second material layers 410 may have a predetermined width 4W in the y-axis direction. Intervals between the plurality of second material layers 410 may be less than the predetermined width 4W of the second material layer 410, but are not limited thereto. The predetermined width 4W of each of the plurality of second material layers 410 may be constant within the tolerance range. Each of the plurality of second material layers 410 may include a plurality of stacked first and second layers 420 and 430. The first and second layers 420 and 430 are sequentially and alternately stacked in the x-axis direction. The first layer 420 may be a material layer having a first refractive index and transparent to the incident light 4L1. The second layer 430 may be a material layer having a second refractive index and transparent to the incident light 4L1. The first and second refractive indices may be different from each other. In one example, the first refractive index may be greater than the second refractive index. For example, the first refractive index may be about 4.192, and the second refractive index may be 1.461. The refractive indices of the first and second layers 420 and 430 may be different from the refractive index of the first material layer 440. The first layer 420 may have a first thickness 4t1. The second layer 430 may have a second thickness 4t2. The first and second thicknesses 4t1 and 4t2 may be the same as or different from each other. In one example, when the first and second thicknesses 4t1 and 4t2 are the same, the thickness may be about $\lambda/4$ where $\lambda$ may be a wavelength of the incident light 4L1. The first and second layers 420, 430 may have the same width. Side surfaces of the first and second layers 420 and 430 may constitute the surfaces facing each other of the plurality of second material layers 410. Any material that is transparent to the incident light 4L1 and satisfies the refractive index condition of the first and second layers 420 and 430 may be used as the first and second layers 420 and 430. In one example, the material of the first layer 420 having a relatively high refractive index may be silicon, for example, amorphous silicon. The material of the second layer 430 having a relatively low refractive index may be silicon oxide, for example, $SiO_2$. Reference numeral 4L2 denotes light, a beam diameter of which has been expanded through the second photonic crystal layer 400.

Figure 5:
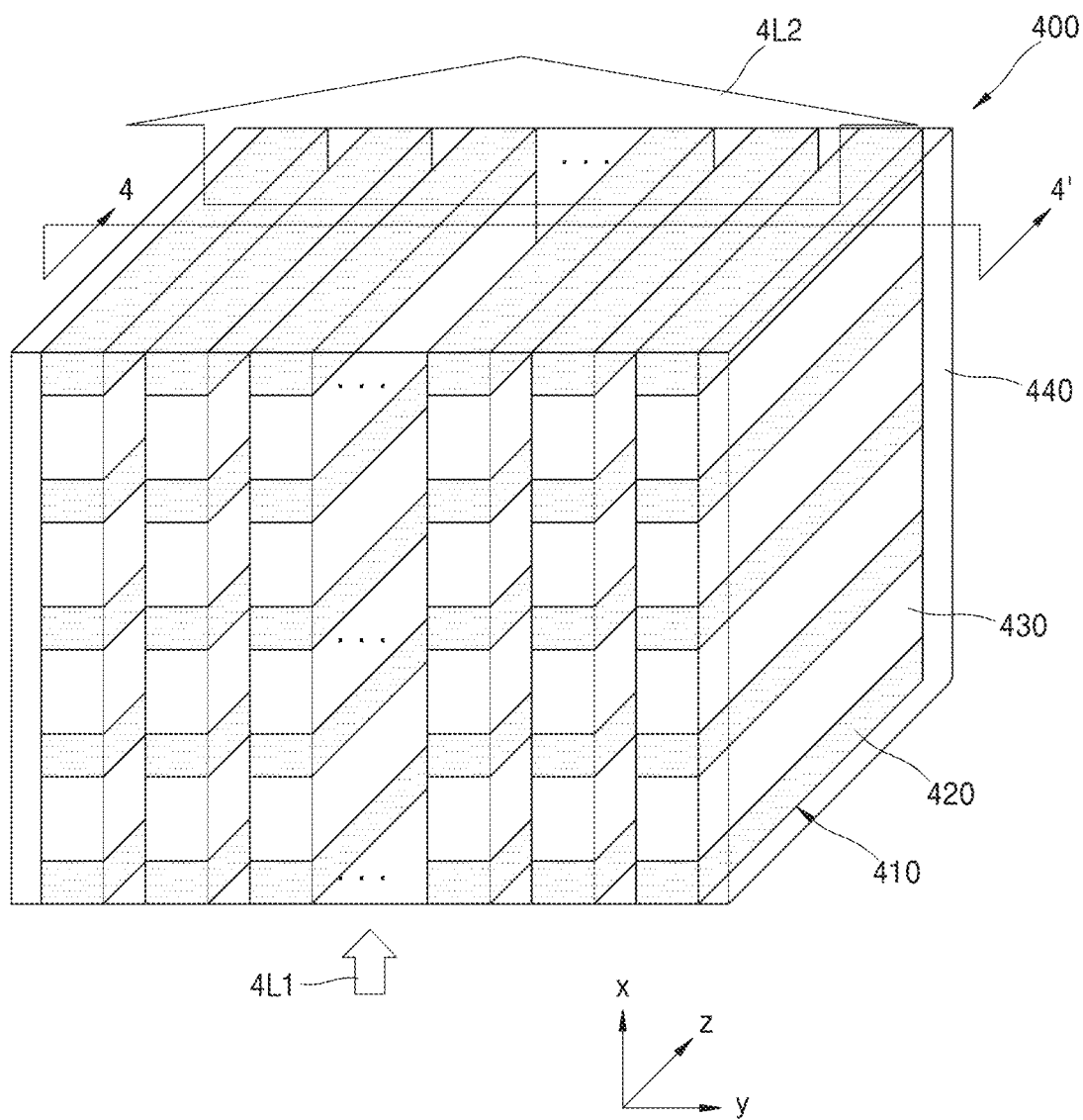
FIG. 5 is a 3D view of a photonic crystal layer shown in FIG. 4.

FIG. 5 shows a three-dimensional view of the second photonic crystal layer 400 of FIG. 4. FIG. 4 shows a cross-sectional view taken along line 4-4' of FIG. 5.

Referring to FIG. 5, the plurality of second material layers 410 are arranged in a row in the y-axis direction, and are arranged parallel to each other in the traveling direction (x-axis direction) of the incident light 4L1. Each of the plurality of second material layers 410 may be regarded as a plate shape or a rod shape aligned in a direction perpendicular to the x-y plane, that is, in a z-axis direction. As a result, each of the plurality of second material layers 410 may have a rod shape having a square cross-section.

FIG. 6 shows a case when a beam incident on the photonic crystal layer 200 of the beam expanding film 100 from a spatial light modulator 600 is emitted with an expanded width. For convenience, the substrate 110 of the beam expanding film 100 is omitted. A liquid crystal panel or a liquid crystal display may be used instead of the spatial light modulator 600.

Referring to FIG. 6, a width (beam diameter) of a light beam IL incident on the photonic crystal layer 200 from each aperture 620 of the spatial light modulator 600 and passing through the photonic crystal layer 200 is expanded due to a DZI characteristic of the photonic crystal layer 200. Accordingly, a width W2 of a light beam OL output from the photonic crystal layer 200 is expanded compared to the width of the incident light beam IL.

As a result, the photonic crystal layer 200 performs an expanding operation of a beam diameter of the light beam IL incident from the aperture 620 of the spatial light modulator 600. A width of the light beam IL incident on the photonic crystal layer 200 from an aperture 620 of the spatial light modulator 600 may be the same as the width W1 of the aperture 620. However, the width W2 of the light beam OL expanded by passing through the photonic crystal layer 200 may be greater than the width W1 of the aperture 620 of the spatial light modulator 600.

As described above, the width W2 of the light beam OL expanded by the photonic crystal layer 200 may vary depending on the characteristics of the photonic crystal layer 200. A pitch P1 of a pixel of the spatial light modulator 600 is equal to the sum of the width W1 of the aperture 620 and the width of a corresponding black matrix 630.

In the case of the related art, due to the black matrix 630 between the apertures 620, there may be a gap without image information between a plurality of light beams emitting from the plurality of apertures 620 of the spatial light modulator 600. The gap between the plurality of light beams plays a role in increasing the intensity of the high-order diffraction pattern.

On the other hand, according to an embodiment, because the photonic crystal layer 200 expands a beam diameter of each light beam, the spatial light modulator 600 has the same pixel interval, and has an effect of emitting light wider than a pixel size at the aperture, and thus, the intensity of a higher-order diffraction pattern is reduced and ultimately, the higher-order diffraction pattern may be removed.

Meanwhile, the intensity of a light beam emitted by a zero-order diffraction is greater than the intensity of a light beam emitted by a first-order diffraction. Therefore, the light beam OL expanded by the photonic crystal layer 200 has a distribution in which the intensity is gradually reduced from the center to periphery, that is, a shape similar to that of the Gaussian Distribution. According to an embodiment, due to the expanded light beam, which has a beam diameter greater than the width W1 of the aperture 620 of the spatial light modulator 600 and has an intensity distribution in which the intensity is gradually reduced from the center to the periphery, high-order noise generated by the spatial light modulator 600 in the focal plane of the Fourier lens (refer to 1140 in FIG. 11) is reduced, and thus, a viewing window, which is an area where a holographic image is viewed, may be expanded.

As described above, the spatial light modulator 600 includes an array including a plurality of apertures 620 and the black matrix 630, and the physical structure of the spatial light modulator 600 may act as a regular diffraction lattice. Accordingly, illumination light is diffracted and interfered by not only a hologram pattern displayed by the spatial light modulator 600, but also the regular structure constituting the spatial light modulator 600. In addition, some of the illumination light is not diffracted by the hologram pattern and passes through the spatial light modulator 600 as it is. As a result, a plurality of lattice spots appear on the focal plane (or pupil plane) of the Fourier lens where a holographic image is collected as points. The plurality of lattice spots degrade the quality of the holographic image to be reproduced and act as image noise that makes viewing of the holographic image uncomfortable. For example, zero-order noise is formed on the optical axis of the Fourier lens due to undiffracted illumination light.

In addition, around the zero-order noise, pieces of high-order noise having a regular lattice structure generated due to interference of light diffracted by the regular pixel structure of the spatial light modulator 600 are formed. However, when the photonic crystal layer 200 is used together with the spatial light modulator 600, the number of pieces of high-order noise having a regular lattice structure may be reduced, and thus, a viewing window may be expanded.

In addition, by using the photonic crystal layer 200, a tolerance according to a change in an angle of a beam incident on the photonic crystal layer 200 may be superior to that of the related art, and the light transmittance may be increased.

As shown in FIG. 7, the second photonic crystal layer 400 described with reference to FIGS. 4 and 5 may be used instead of the photonic crystal layer 200 of FIG. 6.

Simulation

Figure 8:
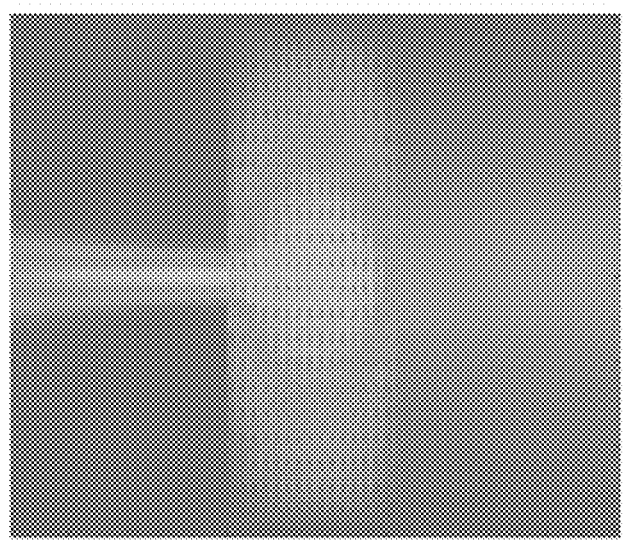
FIG. 8 is a photographed image showing a case when an incident beam is expanded and emitted in a simulation with respect to a beam expanding film according to an embodiment.
Figure 8:
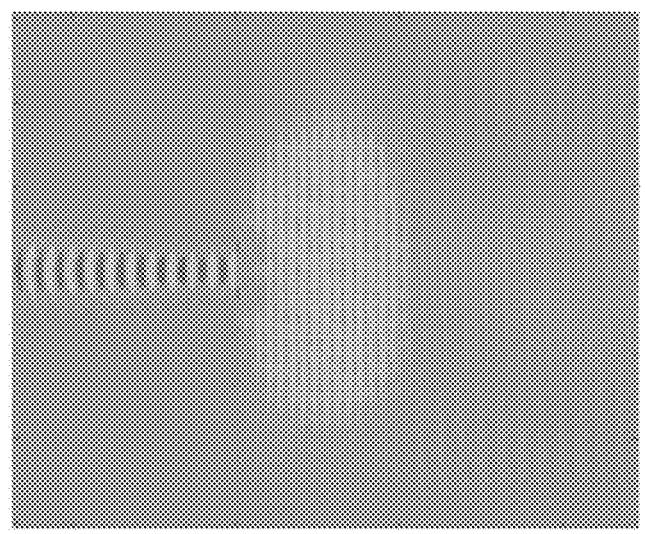
Figure 9:
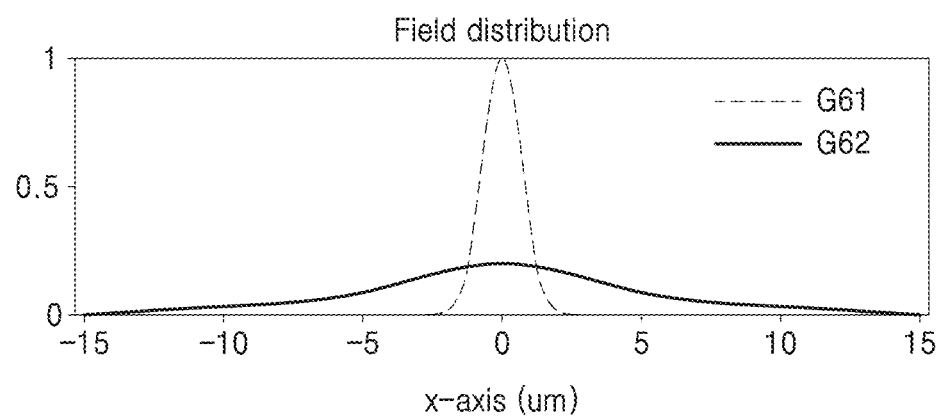
FIG. 9 is a graph showing a simulation result for a beam expanding film according to an embodiment, and showing a field distribution of a beam incident on the beam expanding film and a field distribution of a beam emitted from the beam expanding film.
Figure 10:
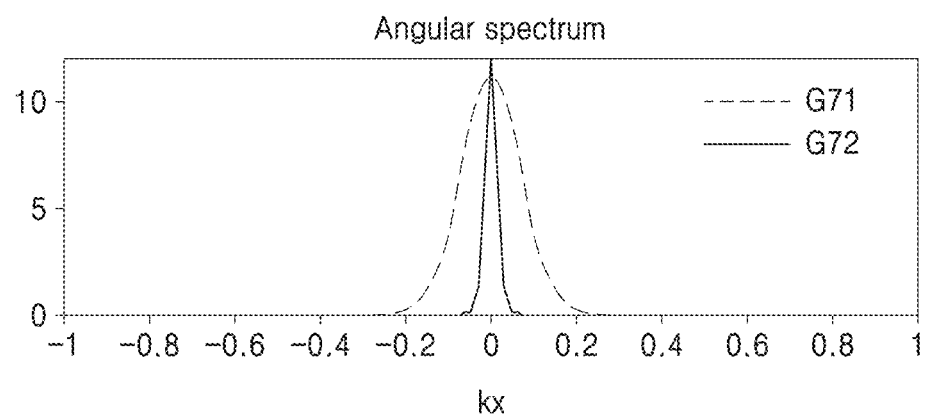
FIG. 10 is a graph showing a simulation result for a beam expanding film according to an embodiment, and showing an angular distribution of a beam incident on the beam expanding film and an angular distribution of a beam emitted from the beam expanding film.

FIGS. 8 to 10 show a numerical analysis simulation and results with respect to the photonic crystal layer 200 according to an embodiment.

In this simulation, a first material layer 210, which is a background material of the photonic crystal layer 200, is set, for convenience, as a free-space, that is, air, and a plurality of second material layers 220 in a rod form are set as amorphous silicon. Also, a lattice constant of the plurality of second material layers 220 is set to 342.5 nm, and a radius of each of the second material layers 220 is set to 68.5 nm, respectively. The dielectric constant c is $(4.232+0.4646i)^2$, and the permeability p is 1.

FIG. 8 shows results of the numerical analysis simulation with respect to the photonic crystal layer 200. In FIG. 8, the upper image shows an absolute value of an electric field E-field, and the lower image shows a real part of the electric field E-field. At an output region, it may be seen that a width of an output light beam (Gaussian beam) is expanded greater than that of an input light beam (Gaussian beam).

FIG. 9 shows field distributions in an input region and an output region of the photonic crystal layer 200, and FIG. 10 shows an angular spectrum, respectively. In FIGS. 9 and 10, first graphs G61 and G71 are measured in the input region, and second graphs G62 and G72 are measured in the output region.

Referring to FIG. 9, it may be seen that a width of a light beam output from the photonic crystal layer 200 is greater than that of a light beam input to the photonic crystal layer 200.

Referring to FIG. 10, it may be seen that a value near kx=0 in the output region is narrow, which means that high-order diffraction noise is reduced (damping).

Figure 11:
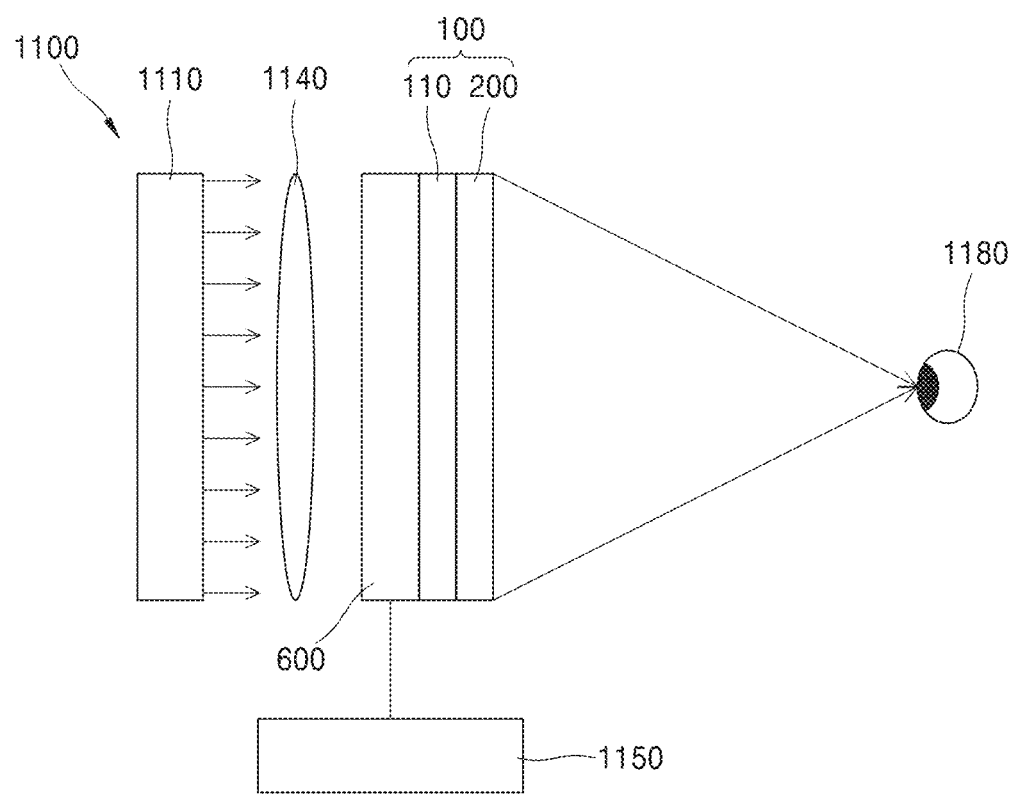
FIG. 11 is a cross-sectional view illustrating a holographic display apparatus according to an embodiment.

FIG. 11 shows a holographic display apparatus 1100 according to an embodiment.

Referring to FIG. 11, the holographic display apparatus 1100 may include a spatial light modulator 600 including a plurality of two-dimensionally arranged pixels and a beam expanding film 100 arranged to expand a beam diameter of light emitted from each pixel of the spatial light modulator 600. The spatial light modulator 600 and the beam expanding film 100 may be separated from each other. In addition, the holographic display apparatus 1100 may further include: a backlight unit 1110 configured to provide coherent collimated illumination light to the spatial light modulator 600; a Fourier lens 1140 configured to focus a holographic image on a space; and an image processor 1150 configured to generate a holographic data signal based on a holographic image to be reproduced and to provide the holographic data signal to the spatial light modulator 600. In FIG. 11, although it is depicted that the Fourier lens 1140 is arranged between the backlight unit 1110 and the spatial light modulator 600, the position of the Fourier lens 1140 is not limited thereto. For example, the Fourier lens 1140 may be arranged between the spatial light modulator 600 and the beam expanding film 100 or may be configured to receive light incident from a light emitting surface of the beam expanding film 100. For example, the Fourier lens 1140 may be parallel to the beam expanding film 100 and face the light emitting surface of the beam expanding film 100 in between the beam expanding film 100 and the viewer's eye 1180.

In one example, the backlight unit 1110 may include a laser diode to provide illumination light having high coherence. The backlight unit 1110 may include any other light source as long as the light source emits light having spatial coherence besides the laser diode. Also, the backlight unit 1110 may further include an optical system that generates collimated parallel light having a uniform intensity distribution by expanding light emitted from the laser diode. Accordingly, the backlight unit 1110 may provide parallel coherent illumination light having a uniform intensity distribution to an entire region of the spatial light modulator 600.

The spatial light modulator 600 may be configured to diffract and modulate illumination light according to a hologram data signal, that is, a CGH data signal, provided from the image processor 1150. For example, the spatial light modulator 600 may include any one of a phase modulator capable of performing only phase modulation, an amplitude modulator capable of performing only amplitude modulation, and a composite modulator capable of performing both phase modulation and amplitude modulation. The spatial light modulator 600 is a transmissive type, but in an example, the spatial light modulator 600 may be a reflective spatial light modulator or may include a reflective spatial light modulator. The spatial light modulator 600 may include a plurality of display pixels which are two dimensionally arranged to display a holographic pattern for diffracting illumination light. For example, the spatial light modulator 600 may use a liquid crystal device (LCD), a semiconductor modulator, a digital micromirror device (DMD), and a liquid crystal on silicon (LCOS), and the like.

Generally, the spatial light modulator 600 includes a black matrix of two-dimensional lattice type and a plurality of apertures surrounded by the black matrix. Below the black matrix, a driving circuit for controlling the operation of each aperture is arranged, and each of the apertures is an active region to change an intensity or phase of transmitted light or reflected light. According to the control of the driving circuit, the intensity or phase of light passing through each aperture or reflected by the aperture may be controlled. For example, when the spatial light modulator 600 displays a hologram pattern according to a CGH data signal provided from the image processor 1150, the intensity or phase of illumination light in a plurality of apertures may be differently controlled. When light beams of illumination light each having modulated intensity or phase converge at a focal point of the Fourier lens 1140 while causing interference in the plurality of apertures of the spatial light modulator 600, a holographic image may be viewed by a viewer's eye 1180. Accordingly, a holographic image to be reproduced may be determined by a CGH data signal provided from the image processor 1150 and a hologram pattern may be displayed by the spatial light modulator 600 based on the CGH data signal.

Figure 12A:
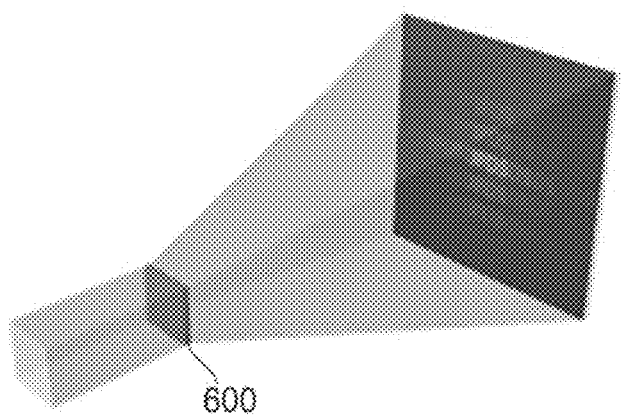
FIGS. 12A, 12B, and 12C are schematic 3D diagrams showing a comparative example of a holographic display apparatus that does not include a beam expanding film according to an embodiment and an image displayed by the holographic display apparatus.
Figure 12B:
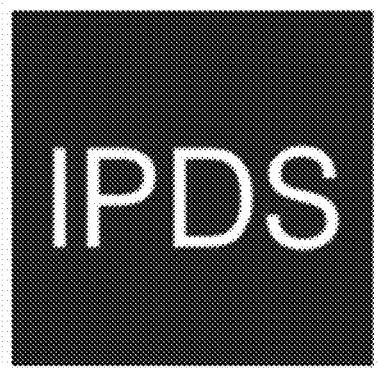

FIG. 12A shows a holographic display including the spatial light modulator 600 without the beam expanding film 100 according to an embodiment described above, and FIG. 12C shows a holographic image formed by the holographic display apparatus of FIG. 12A. FIG. 12B shows an original image.

Figure 13A:
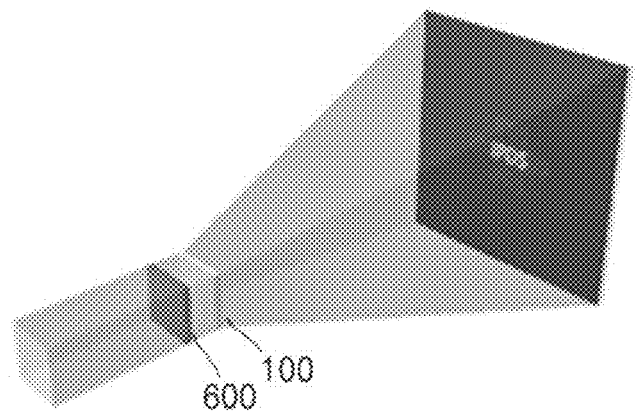
FIGS. 13A, 13B, and 13C are schematic 3D diagrams showing a holographic display apparatus that includes a beam expanding film according to an embodiment and an image displayed by the holographic display apparatus.
Figure 13B:
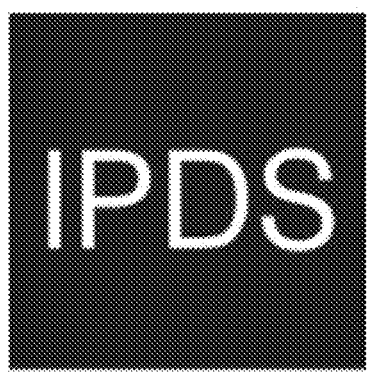
Figure 13C:
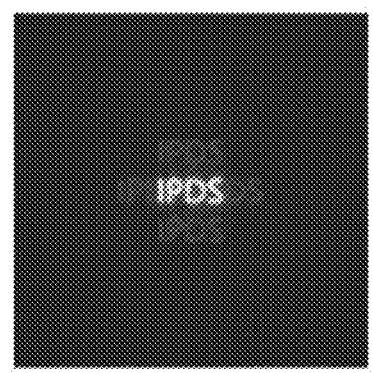

FIG. 13A shows a holographic display according to an embodiment, that is, the holographic display including the spatial light modulator 600 together with the beam expanding film 100, and FIG. 13C shows a holographic image formed by the holographic display of FIG. 13A. FIG. 13B shows an original image. The original image is the same as the original image of FIG. 12B.

Figure 12C:
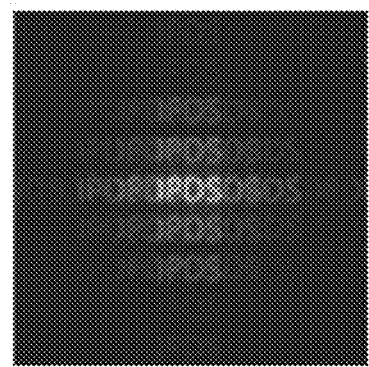

Comparing the holographic images shown in FIGS. 12C and 13C with each other, in the case of the holographic image of FIG. 12C, high-order diffraction noise, that is, a plurality of holographic images exists not only in the center of the display region but also around the center, and some images overlap with each other, and thus, the image is not clearly recognized as a whole.

On the other hand, in the case of the holographic image of FIG. 13C, the same image as the original image exists in the center of the display region, and it is hard to recognize a holographic image around the center. That is, the light intensity of the image present around the center is negligible compared to that of the image present in the center. Therefore, the holographic image present in the center may be recognized clearly.

The results of FIGS. 12A-12C and 13A-13C suggest that, because the beam expanding film 100 described above is provided in the holographic display, high-order diffraction noise is removed, and thus, a clear holographic image together with a widened viewing window may be obtained.

Because the disclosed holographic display apparatus includes a beam expanding film including photonic crystals, a first-order or higher-order diffraction may be removed or reduced, and thus, a space for viewing a holographic image, that is, a viewing window may be increased. Therefore, the viewer may view a holographic image in a wider region.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A beam expanding film comprising:
a photonic crystal layer that expands a width of incident light and emits light having an expanded width, the photonic crystal layer comprising:
a first material layer; and
a plurality of second material layers buried in the first material layer,
wherein each of the plurality of second material layers comprises a plurality of stacked first layers and second layers.

2. The beam expanding film of claim 1, further comprising a transparent substrate having a refractive index less than a refractive index of the photonic crystal layer, wherein the photonic crystal layer is provided on the transparent substrate.

3. The beam expanding film of claim 1,
wherein each of the plurality of second material layers is separated from and parallel to each other, and
wherein each of the plurality of second material layers has a rod shape having a round cross-section.

4. The beam expanding film of claim 1, wherein a space between adjacent second material layers of the plurality of second material layers is filled with the first material layer.

5. The beam expanding film of claim 1, wherein each of the plurality of second material layers comprises amorphous silicon.

6. The beam expanding film of claim 1, wherein each of the plurality of second material layers is separated from and parallel to each other of the plurality of second material layers, and
wherein each of the plurality of second material layers comprises a plane facing a plane of each other of the plurality of second material layers.

7. The beam expanding film of claim 1, wherein each of the plurality of second material layers is arranged perpendicular to the incident light.

8. The beam expanding film of claim 1, wherein the plurality of stacked first layers and second layers are sequentially and alternately stacked.

9. The beam expanding film of claim 1, wherein a refractive index of the first material layer, a refractive index of the plurality of first layers, and a refractive index of the plurality of second layers are different from each other.

10. The beam expanding film of claim 9, wherein the refractive index of the first material layer is less than the refractive index of the plurality of second layers, and the refractive index of the plurality of first layers is greater than the refractive index of the plurality of second layers.

11. The beam expanding film of claim 1, wherein, when a wavelength of the incident light is $\lambda$, a thickness of each of the plurality of stacked first layers and second layers is about $\lambda/4$.

12. The beam expanding film of claim 1, wherein each of the plurality of first layers comprises a material that is transparent to the incident light and has a refractive index greater than a refractive index of the plurality of second layers.

13. The beam expanding film of claim 1, wherein each of the plurality of second layers comprises a material that is transparent to the incident light and has a refractive index less than a refractive index of the plurality of first layers.

14. A beam expanding film comprising:
a photonic crystal layer that expands a width of incident light and emits light having an expanded width, the photonic crystal layer comprising:
a first material layer; and
a plurality of second material layers buried in the first material layer,
wherein the photonic crystal layer comprises a double-zero index (DZI) material.

15. A holographic display apparatus comprising:
a backlight unit configured to provide coherent collimated light;
a beam expanding film facing the backlight unit, the beam expanding film comprising a photonic crystal layer that expands a width of incident light and emits light having an expanded width, the photonic crystal layer comprising a first material layer and a plurality of second material layers buried in the first material layer;
a flat panel arranged between the backlight unit and the beam expanding film, the flat panel being configured to provide a hologram; and
a lens configured to focus a holographic image on a space.

16. The holographic display apparatus of claim 15, wherein the lens is arranged between the backlight unit and the flat panel.

17. The holographic display apparatus of claim 15, wherein the lens is arranged between the flat panel and the beam expanding film.

18. The holographic display apparatus of claim 15, wherein the lens is arranged at a position where light emitted from the beam expanding film is directly incident on the lens.

19. The holographic display apparatus of claim 15, wherein the flat panel comprises a spatial light modulator.

20. The holographic display apparatus of claim 15, wherein the flat panel comprises a liquid crystal device (LCD), a semiconductor modulator, a digital micromirror device (DMD), or a liquid crystal on silicon (LCOS).

* * * * *